United States Patent [19]

Goldsby et al.

[11] 3,858,181

[45] Dec. 31, 1974

[54] MONITORING SYSTEM

[75] Inventors: Arthur F. Goldsby, Morrison; Satish K. Anand, Denver; Frank J. Haberl, Golden, all of Colo.

[73] Assignee: Martin Marietta Corporation, Rockville, Md.

[22] Filed: Oct. 17, 1973

[21] Appl. No.: 407,388

[52] U.S. Cl. .................. 340/150, 340/408

[51] Int. Cl. .................. H04q 9/00

[58] Field of Search ........ 340/213 R, 408, 150, 151, 340/152

[56] References Cited

UNITED STATES PATENTS

| | | | |
|---|---|---|---|
| 3,532,827 | 10/1970 | Ewin | 340/151 |
| 3,676,878 | 7/1972 | Linder | 340/408 |
| 3,744,043 | 7/1973 | Walden | 340/213 R |
| 3,820,074 | 6/1974 | Toman | 340/151 |

FOREIGN PATENTS OR APPLICATIONS

| | | | |
|---|---|---|---|
| 1,463,605 | 4/1969 | Germany | 340/152 |

*Primary Examiner*—Donald J. Yusko
*Attorney, Agent, or Firm*—Gay Chin; James B. Eisel

[57] ABSTRACT

This invention relates to a system for monitoring the condition and operation of remotely located machines, such as coin-operated vending machines. In one embodiment, switches in each machine convert operating conditions into a binary digital word for that machine, which is stored temporarily. Such words for a plurality of machines are then transferred to a memory, whence they are retrieved, coded as to machine number and transmitted via telephone line to a control processing unit where the various machine conditions are recorded and displayed.

7 Claims, 10 Drawing Figures

FIG. I

VENDING MACHINE AND DATA CONDITIONER

DATA COMPARE/COUNTER UPDATE

READ ALL DATA

MONITORING SYSTEM

This invention relates to a system for monitoring the operating condition of remotely located machines and the like, and is particularly adapted for monitoring the operating condition and amount of sales of a large number of remotely located coin-operated vending machines.

Coin-operated vending machines are typically scattered over a fairly extensive geographic area, and maintaining them fully stocked and in operative condition poses a substantial problem. Usually the machines are visited in rotation by a route man, who stocks the machines and reports any faulty operation so that a repairman may be sent. Loss of revenue due to empty or inoperative machines is considerable, and could be greatly reduced by knowing immediately which machines need attention, and additional savings could be effected by more efficient use of the routemen, obviating the waste of their time in visiting operative machines that need no restocking. Further, the routeman generally collects the money from the machine, and there is at present no reliable way of confirming his count.

The above problems could be removed or at least greatly diminished if there existed a practical way of obtaining, at some central location, an immediate indication of any failure or shortage identified as to a particular machine, and a count of the money taken in by each machine. This invention provides such a practical system.

In the monitoring system of this invention, switches in the monitored machines generate binary condition indications. The binary information generated by the switches in each machine is stored in a register attached to the machine. Then the binary data from each machine register, for a local group of machines, is sequentially fed to a local storage unit called a data concentrator. This data is compared with the data previously received from each machine, and any changes are flagged before the data is stored. Then, only the changed data is transmitted via a communication link from each data concentrator storage to a central control called a central processing unit, where the machine operating data may be processed in any desired way, displayed, and permanently recorded or stored.

While the invention was developed for monitoring coin operated vending machines, it clearly is suitable for monitoring any type of machines or the like where the conditions or operations to be monitored lend themselves to the development of binary data.

The manner in which this invention achieves its objectives may be seen more clearly by reference to the following detailed specification and to the appended drawings, which form a part of the specification, and in which.

Figure 6:
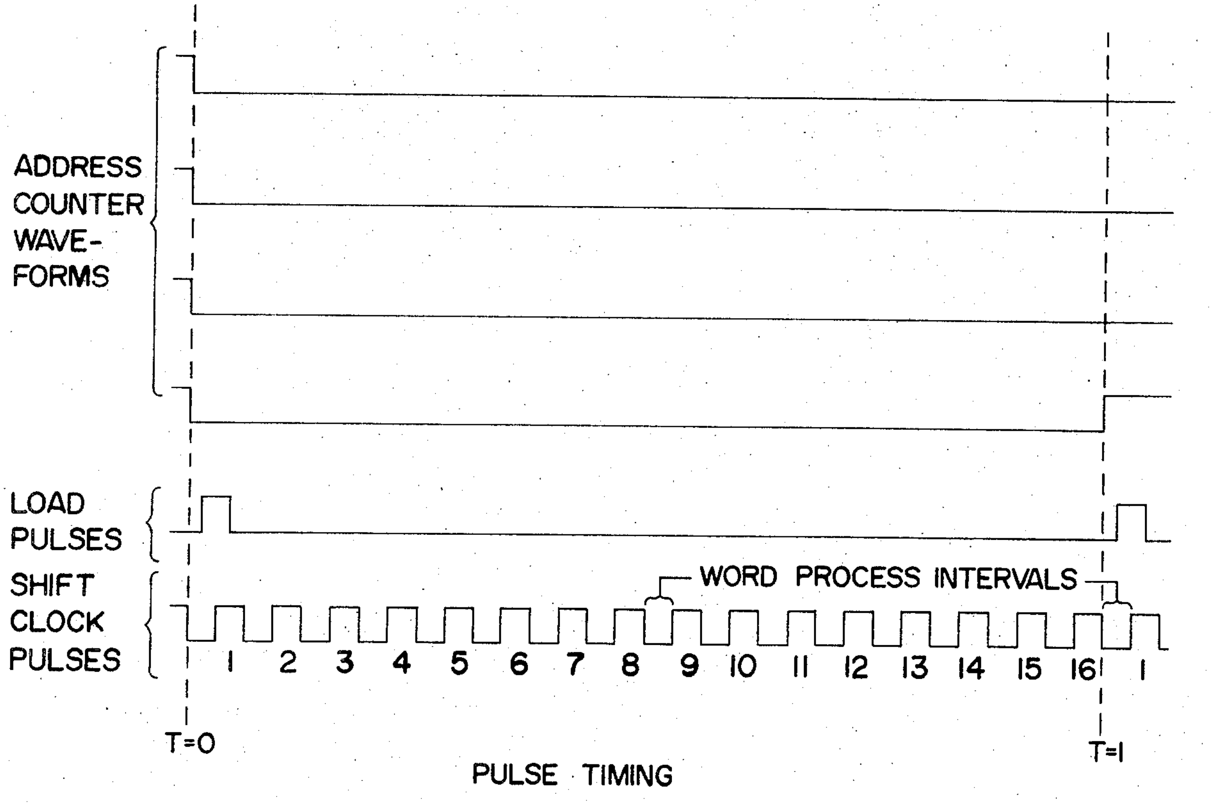
Figure 7:
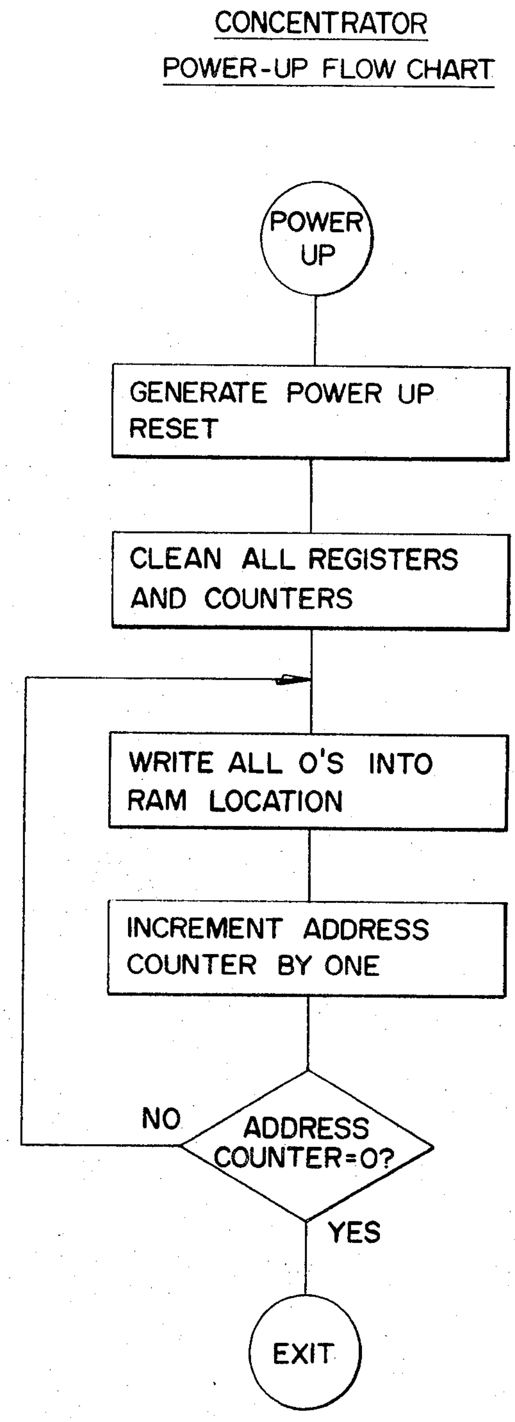
Figure 8:
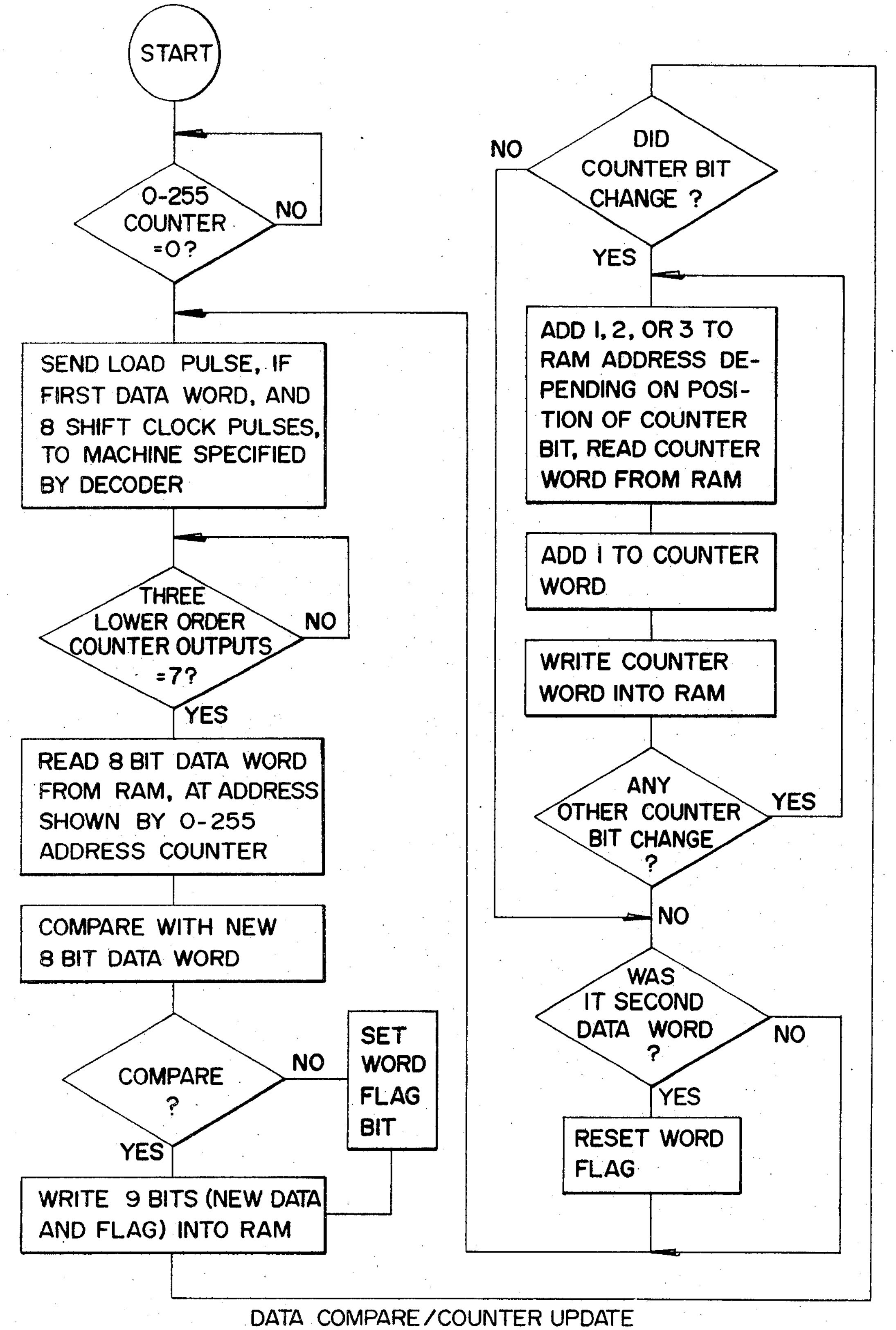
Figure 9:
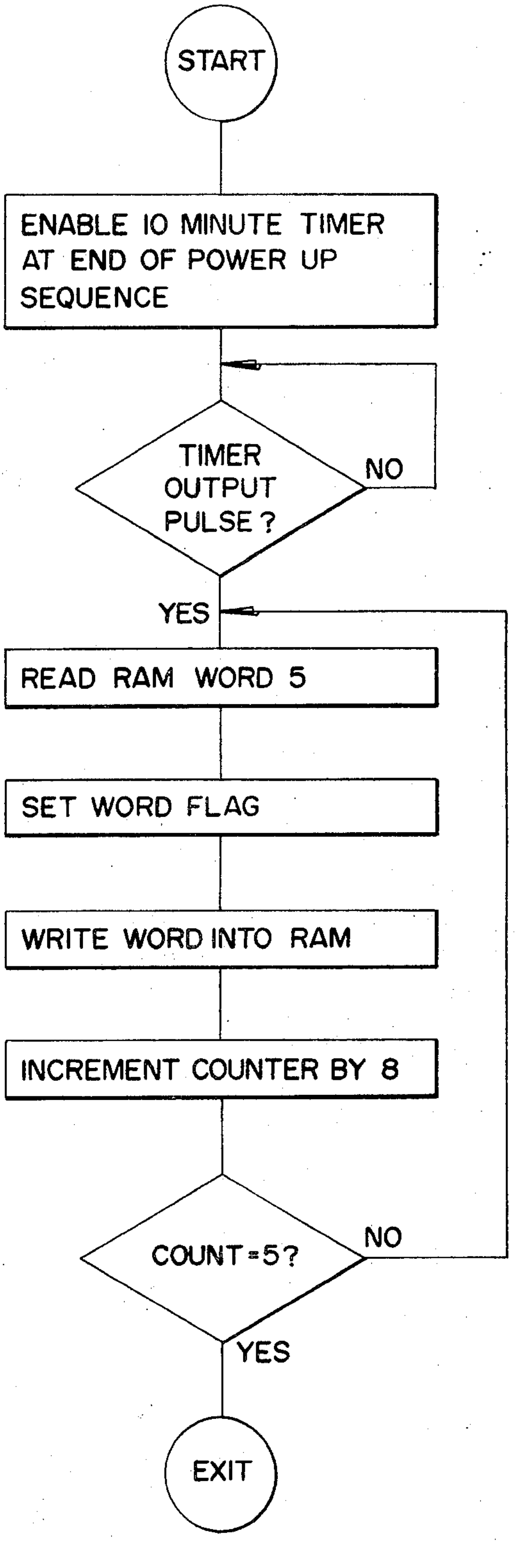
Figure 10:
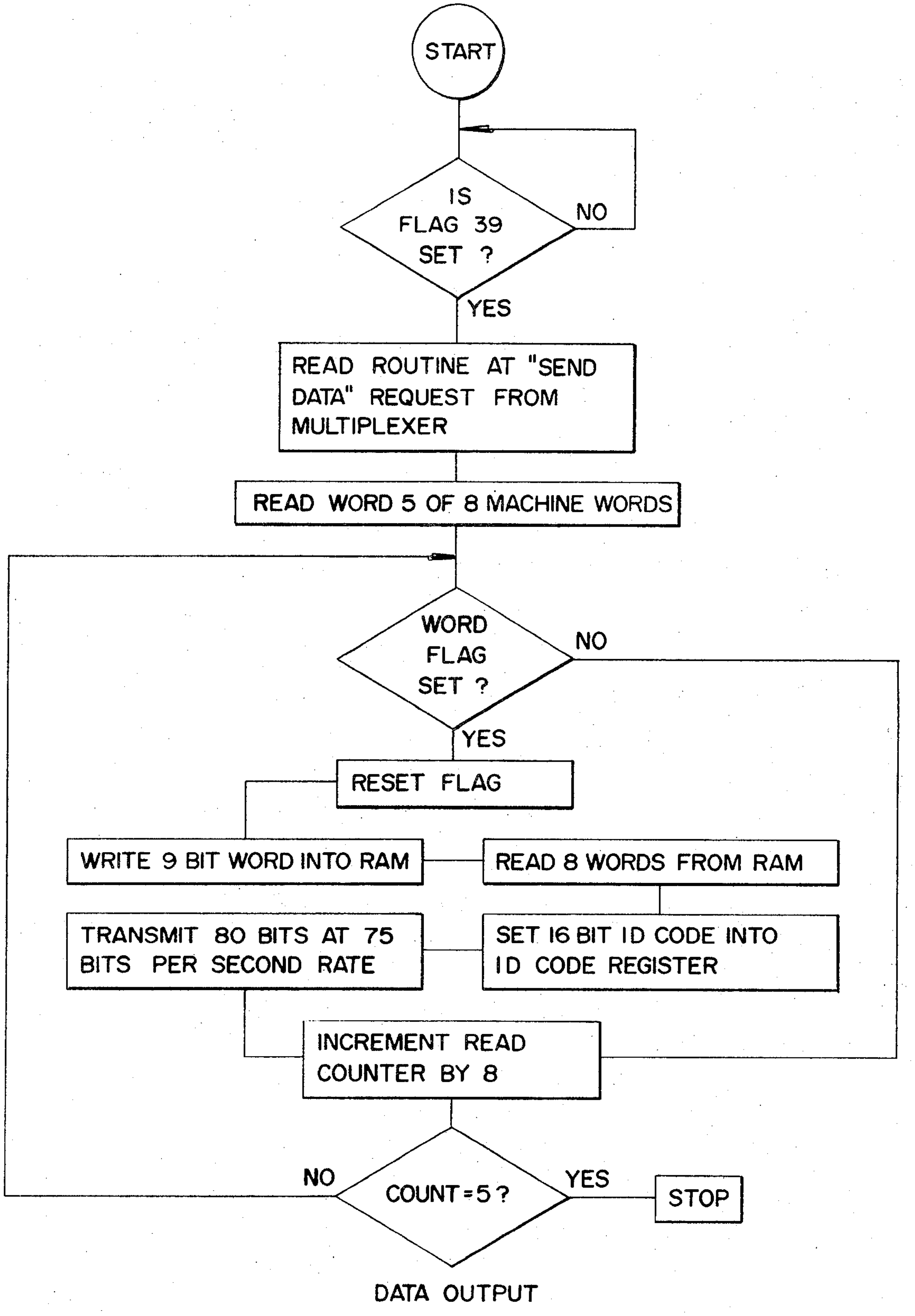

FIG. 6 comprises waveforms illustrating the relative timing of certain pulses controlling system data transfer;

FIG. 7 is a flow chart illustrating the system power-up procedure when power is initially turned on;

FIG. 8 is a flow chart illustrating the dual procedures of comparing incoming data with corresponding data already in storage and updating the stored counts in accordance with data changes;

FIG. 9 is a flow chart indicating the procedure for transmitting all information in the memory, not just changed information, after certain extended intervals of time; and FIG. 10 is a flow chart illustrating the procedure for transmitting from the memory data in which a change has taken place recently.

Figure 1:
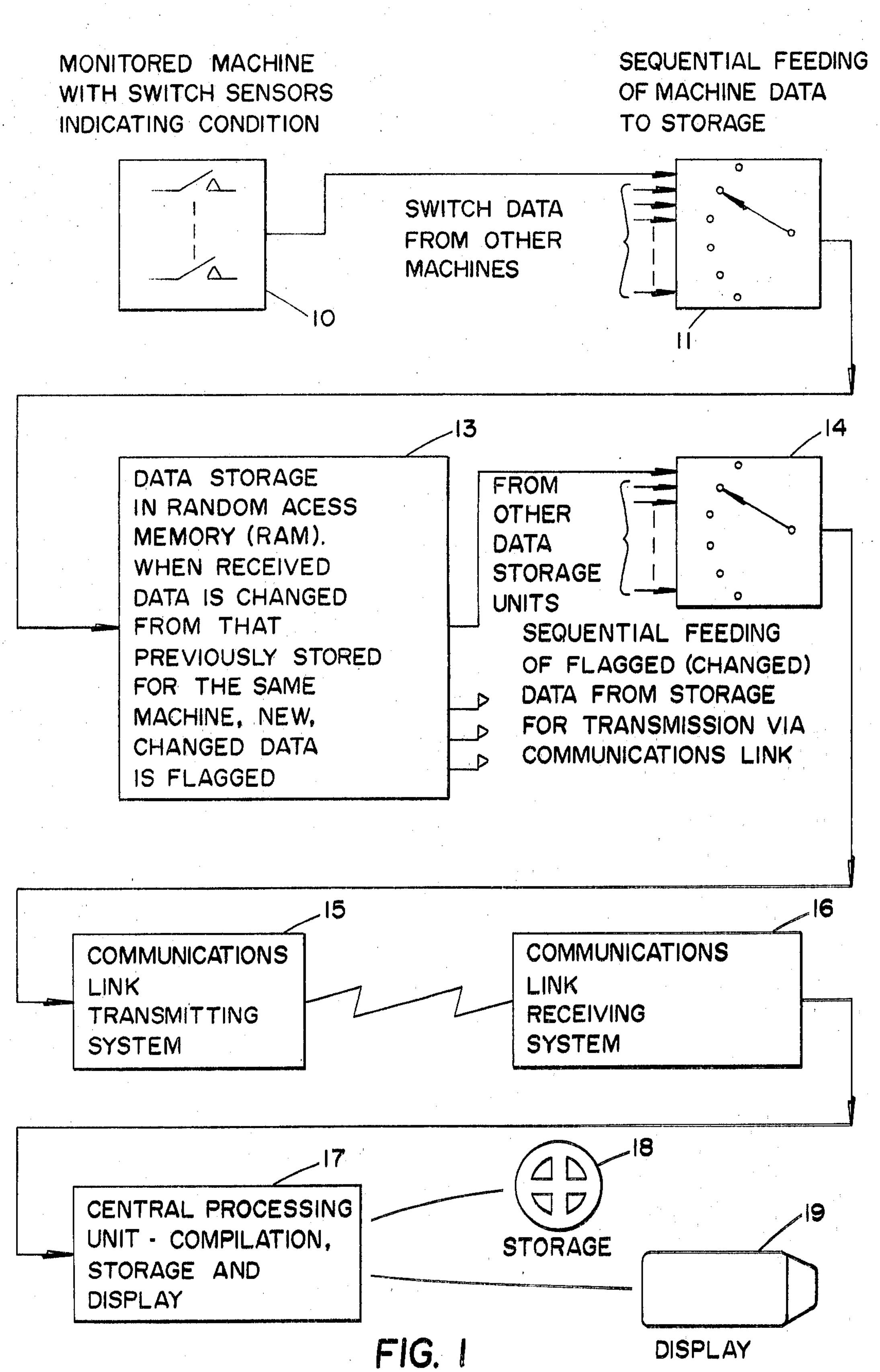
FIG. 1 is a highly schematic representation of the basic operation of the system of the present invention.

Turning to FIG. 1, the inventive system is illustrated by functional blocks, which are intended to show general system function, and not to correspond exactly with hardware boxes. A number of vending machines 10 (which may be referred to herein as VM's, or "machines,") only one of which is shown, are connected to the input of a switching or selecting means 11. Sensor switches 12 in the vending machine provide an indication of the condition of the machine and its operation. A switch may indicate, for instance that a particular vend item (such as paper cups, a particular brand of cigarette, etc.) is exhausted, or that security has been breached (cash box or door forced open) or a switch may indicate each vend of an item having a particular price, or each vend of a certain category of item (i.e., each brand of cigarette.) The exact manner of obtaining this information from each vending machine is described below in connection with FIG. 2.

There are a number of machines to be monitored in a given local area, 16 are used in this embodiment as comprising each local grouping. The number of machines in such a local group will depend, obviously on their physical proximity, since the machine circuitry from each machine in a local grouping will be hard-wired to its corresponding storage means.

Data from the 16 VM's of a local group is sequentially switched as illustrated by the schematic switching means 11 into a data storage device 13 which includes a random access memory (RAM) and means to flag information fed into the memory from a particular machine if it has changed from the previous time. Therefore at any given time, the storage means 13 will contain a complete file of data from the sixteen machines feeding it, along with flags indicating all the data that has recently changed. Flags indicating recently changed data are shown schematically projecting from the side of data storage device 13.

There are a number of such storage devices in a typical system, each storing data from 16 VM's in its local group. These storage devices are sequentially scanned for flagged information, that is, information that has been changed since the last such scan, and this flagged information is sequentially fed through a second switching or selecting means 14 to a transmitter 15 for transmission via a communications link to a receiver 16 and thence to a central processing unit (CPU) 17, where the data is compiled, stored and displayed by or upon associated equipment. In FIG. 1 the data storage function is indicated symbolically by the tape reel 18 and data display is symbolized by the cathode ray tube (CRT) display unit 19.

By transmitting via the communications link only recently changed data, the system provides quicker information at the CPU on changed conditions, and by substantially reducing the quantity of information transmitted compared to that that would need to be transmitted were no such selective process used, a lower quality and therefore less expensive communications link may be used.

Another operational advantage of the system is the independence of the various units with respect to their timing and control systems, which will become clearer as a result of the more detailed description to follow. The result of this independence of units from each other is that it is much easier to expand and contract the system to include larger or smaller number of monitored machines than it would otherwise be if all the units in the system required synchronized timing and control that had to be carefully redesigned and/or adjusted when a new group of machines, with accompanying storage system, were added.

Figure 2:
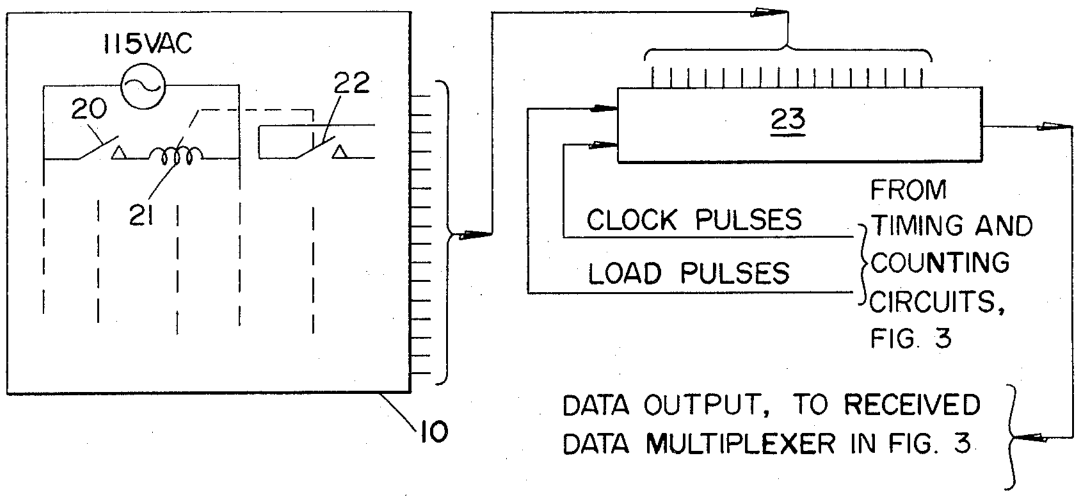
FIG. 2 is a schematic representation of the sensor switches in a typical vending machine and its associated data conditioner shift register.

FIG. 2 shows a typical VM 10 schematically. Microswitches 20 in series with relay coils 21 are placed in parallel across the machine's 115 VAC supply. These microswitches 20 are the data sensors, that indicate supply exhausted, malfunction, vend, or any function of the machine that is to be monitored. In this embodiment each machine contains 16 microswitches. If a microswitch 20 is closed, say by a vend from the machine, it completes the circuit through relay coil 21, energizing the coil and closing the set of relay contacts 22. The position, open or closed, of contacts 22, generates the binary bit of data from the machine describing a particular function or condition.

Clearly any sensing device capable of on-off or binary indication could be used. However, the microswitch and relay combination has the advantage that the microswitch is an inexpensive and small device suitable for this function, and the conjunctive use of the relay provides a desirable separation between the monitoring system electrical circuit, encompassing the relay contacts, and the vending machine 115 VAC electrical circuit, encompassing the microswitches and relay coils.

We have said that each machine contains 16 microswitches, which means that it will also have 16 corresponding sets of relay contacts 22 generating 16 binary data bits. The data bits will describe two basic types of conditions: (1) an abnormality, such as a malfunction, security breach or outage of a vend item, and (2) a normal machine function, such as a vend of a certain value or certain category. The principal purpose of obtaining the first type of data, on abnormalities, is to get it to the centrally located CPU as quickly as possible so that it may be corrected. The purpose of the vend data is to keep a record, or count, and the distinction between the two types of data is made here because they are dealt with differently in the system, with the latter type of data bits being referred to as "count bits." In the embodiment described herein, provision is made for there being 6 "count bits" among each machine's 16 data bits. The count bits must occupy known positions in the 16 bits. The particular positions are not important, but they must be the same for all machines.

The binary bit outputs of the sixteen sets of relay contacts 22 are presented in parallel to a data conditioner shift register 23. This shift register is conveniently located physically in a connector attached to the machine and known as the data conditioner. The shift register, while it may be of any type, is conveniently, like the rest of the logic in the system, conventional 5 volt integrated circuit logic, and this shift register may be comprised of two model 74L165 registers.

LOAD and CLOCK inputs and an output are shown for shift register 23. The LOAD and CLOCK inputs come from the data concentrator shown in FIG. 3 and their derivation will be described in conjunction with it. An initial LOAD pulse, when received from the data concentrator, causes all 16 binary bits to be parallel loaded into register 23. The LOAD pulse is then followed by a series of CLOCK pulses, which clock the data out of register 23 serially, whence it is sent to the data concentrator.

Figure 3:
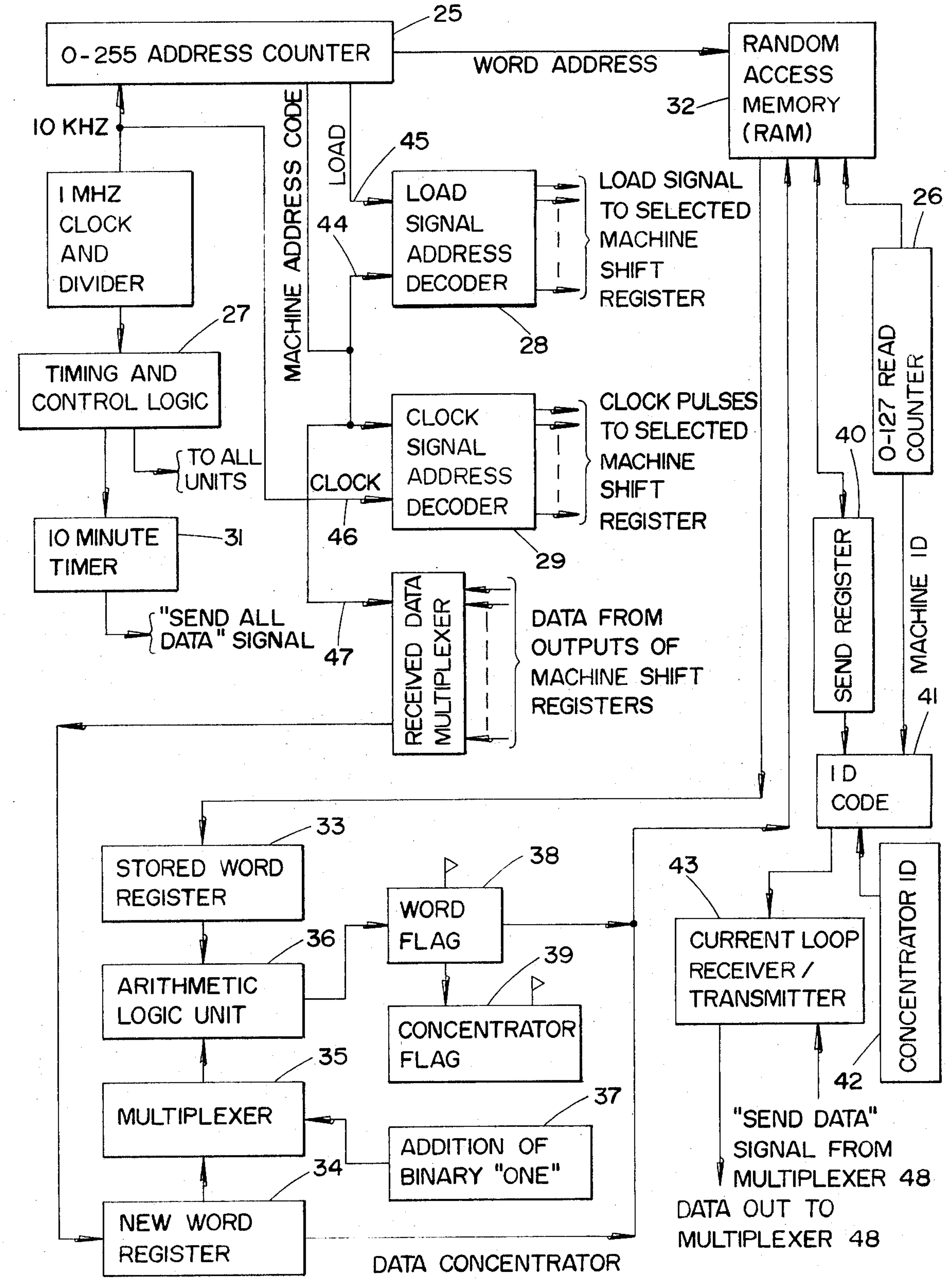
FIG. 3 is a functional block diagram of the data concentrator, in which the machine data is compared and stored.

FIG. 3 shows the data concentrator, which is the heart of the system. It functions to sequentially receive data from each of its 16 machines, compare that data with data previously received, store the data and flag any recently changed data. When interrogated it will send out only the flagged data, but will at extended intervals make a complete transmission of all its stored data. The makeup of the data concentrator, broadly, comprises: the timing, counting and control function made up of the one megahertz clock and divider 24, the 0–255 counter 25, the 0–127 read counter 26, the 10 minute timer 31, and the timing and control logic 27; the means for requesting data and receiving it from a selected machine, comprising the LOAD and CLOCK signal address decoders 28 and 29 respectively and received data multiplexer 30; the storage means, comprising random access memory (RAM) 32; the data comparison function, including the stored word and new word registers 33 and 34 respectively, the multiplexer 35, the arithmetic logic unit (ALU) 36, the addition of binary "one" unit 37, the word flag 38 and the concentrator flag 39; and the data sending means, comprising the send register 40, the identification (ID) code unit 41, the concentrator ID unit 42, and the current loop receiver/transmitter 43.

The clock and divider 24 is of conventional design, provides a 1 MHZ clock signal to the timing and control logic circuitry 27, and divides this 1 MHZ down to a 10 KHZ signal supplied to the 0–255 counter 25. The timing and control logic shown schematically as block 27 is conventional 5 volt circuitry. Circuit details are not shown, although basic LOAD and CLOCK pulses are shown in FIG. 6 in order to indicate their relationship to each other in aid of explanation of the basic system data transfers. Given the control functions to be performed, the requisite logic and control circuitry is conventional, if somewhat complex, and setting the circuitry out in detail would increase greatly the complexity of drawings and text and tend to obscure the nature of the invention.

The 0–255 counter 25 is conventional IC circuitry and may conveniently comprise two Fairchild 9316 counters. The basic function of counter 25 is to direct the sequential transfer of data from the machine data conditioner registers to the data concentrator RAM. To do this it must cause each machine to be sequentially addressed, and while addressed, the machine data must be loaded into its register 23 and then clocked out and into the data concentrator RAM. Counter 25 accordingly generates address coding, and LOAD pulses, which are illustrated in FIG. 6 along with the CLOCK pulses from clock 24. The waveforms of the four higher order terminals of counter 25 are shown at the top of FIG. 6 and the combination of the values at these four outputs comprises the machine address code. At time T = 0, the values of the four higher valued outputs of counter 25 will all go to zero. The values of these four higher valued outputs are shown as the upper four waveforms of FIG. 6 and comprise the machine address code. At T = 0, the first machine is being addressed. At T = 0 the values of the four lower valued of the eight counter terminals will also be 0. At T = 1, comprising the 10KHZ clock divided down by sixteen, the values of the lower valued four terminals will again have reached 0, but one of the higher valued terminals will have changed its value to logical 1. At T = 1, the second machine is addressed. And so on, generating through the value permutations of the higher valued four terminals the sequential addresses of the 16 machines wired to the data concentrator.

Since the counter has counted down 16 for each address change, there will be 16 CLOCK pulses emanating from clock 24 during each address interval. A LOAD pulse is generated by a slight delay from each address change and occupies the interval between the address change and the first succeeding CLOCK pulse.

Data transfer is accomplished as follows: The machine address code (comprising the four higher order outputs discussed above) is fed from counter 25 to load signal address decoder 28 at input 44, and the LOAD signal is fed from counter 25 to decoder 28 at input 45. Decoder 28 is a model 9311 IC and has 16 outputs, each connected to the LOAD input of a separate data conditioner shift register 23 (see FIG. 2). The address code causes decoder 28 to feed the LOAD pulse through to the chosen machine register. This loads the machine data into the register.

Then clock signal address decoder 29, which is also a model 9311 IC and is connected in an analogous manner, causes the CLOCK pulses fed to it at input 46 to be fed through to the selected machine. These CLOCK pulses, as described in connection with FIG. 2 are received at the CLOCK input of register 23 and cause the stored information to be clocked out serially.

The output of each machine register 23 is connected to one of the 16 data inputs of received data multiplexer 30 and the machine address code is fed from counter 25 to multiplexer 30, at input 47, causing the data from the selected machine to be fed through multiplexer 30 to the new word register 34. This completes the data transfer from these machines to the storage and comparison system.

In the storage and comparison functions, the data from each machine is dealt with as two 8-bit words instead of one 16-bit word. Since the data is clocked in by the clock pulses without interruption, the 8-bit words must be dealt with and processed in the word process intervals, comprising the intervals between the 8th and 9th, and 16th and 1st, CLOCK pulses. These intervals are indicated on the CLOCK pulse waveform of FIG. 6. Processing can occur in these intervals because the processing logic operates at a 1 MHZ rate, whereas the shift pulses operate at 10 KHZ.

Once the data words are received into the concentrator, they are compared with previous words to flag changes and then stored. The procedure for this comparison and storage may be understood by reference both to the schematic diagram of FIG. 3 and the "data compare/counter update" flow chart of FIG. 8.

Referring to the flow chart, counter 25 is started at zero, and the LOAD and CLOCK pulses are then sent to retrieve the data from the selected machine, a process just described. The arrival of the 8th bit of data (end of first data word) is indicated by monitoring the three lower order outputs in counter 25, when the count reaches 7, the first word has been received in new word shift register 34.

Each word of each machine has a designated position in RAM 32, which will be described below, and counter 25 in its sequential generation of address information, maintains the address position of each 8 bit data word in the RAM. As each word is received into new word register 34, the corresponding word from the same machine is retrieved from the RAM via the "word address" from counter 25, and this previous word is read into stored word shift register 33.

The stored word and the new word are then compared in arithmetic logic unit 36. The stored word is fed into one set of eight inputs directly, and the new word is fed through multiplexer 35, whose function will be described below, into the other set of eight inputs of the arithmetic logic unit (ALU) 36. The ALU is a conventional logic unit and may conveniently be formed of two Fairchild 9341 4-bit units. The ALU is a versatile device that can be instructed to perform several arithmetic functions. It is set at this point for a "compare." It compares the two eight bit inputs and provides two types of output indications. The first is a simple 1-bit "compare" or "no compare" indication as to whether all eight bits of the two input words compared.

If the ALU output shows "no compare", that is, the new data word differs from the one previously stored, then the word flag flip flop 38 is set, and the new word is written into the RAM, with the set flag flip flop 38 adding a ninth, "flag" bit to the 8-bit word as it is stored. Word flag 38 when it is set also sets concentrator flag flip flop 39, which indicates that there is changed information stored in the RAM of this concentrator.

This completes the procedure for comparison of new and stored data. The next function is to update the count maintained in the RAM of the changes in each count bit of each machine word. It was indicated earlier that the system will handle six count bits in each 16 bit data sequence from a machine; it will handle this on the basis of 3 count bits per 8-bit word, i.e., a designated three bits of each 8-bit word may be count bits.

Returning now to the ALU outputs at the time of comparison, in addition to the single compare or no compare bit, the ALU provides 8 output bits indicating whether each bit, 1st, 2nd, 3rd, etc., in each word compares wth the correspondingly positioned bit in the other word. If the data word was changed, these individual outputs are examined for the bit positions corresponding to counter bits. As the flow chart of FIG. 8 indicates, if a count bit is found to have changed, the word containing the count for that particular bit is retrieved from the RAM, it is incremented one unit and then returned to the RAM, and any other changed count bits in the data word are similarly dealt with.

Figure 5:
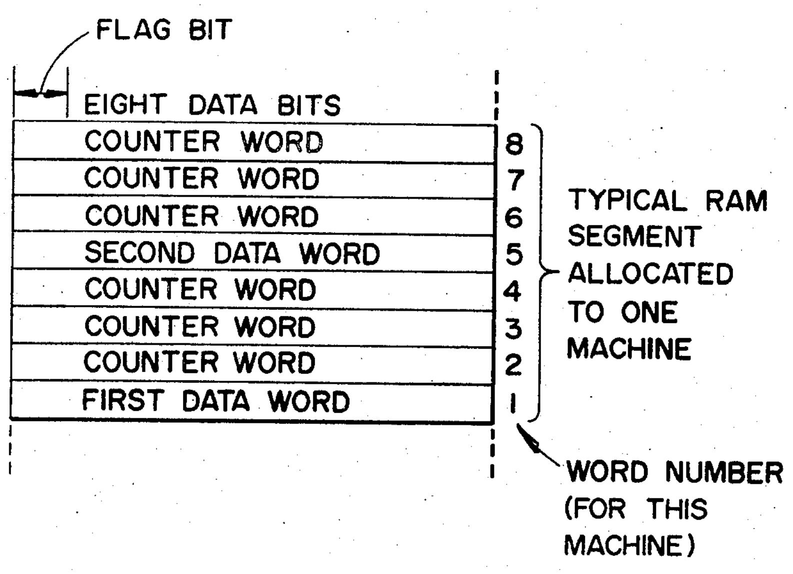
FIG. 5 is a schematic representation of that portion of the data concentrator random access memory allocated to one machine.

To see how this is accomplished, turn to the schematic representation of a RAM segment in FIG. 5. This shows very schematically a segment of the memory assigned to one machine, and it shows the relative positions in the segment of the two 8-bit data words and the six 8 bit counter words. All of the word slots are really 9-bits, since an extra bit is provided to be set as a flag bit, indicating change. Just above each data word are the three counter words that are used to maintain a count of the changes in the three counter bits in the data word, one counter word corresponding on a one-to-one basis to one count bit position. Since the positions of the machine data words in the RAM are generated by the counter 25, and are read out of the RAM by position number, what is required to retrieve or read out a counter word is the data word position incremented by one, two, or three depending upon which count bit is involved. The RAM comprises nine Intel 1101 256×1 units, and we use only 128 of the available 256.

When the ALU comparison output indicates a count bit difference, then, as the FIG. 8 flow chart shows, 1, 2 or 3 is added to the data word address designation and the counter word is read from or retrieved from the RAM and placed in the ALU. The ALU inputs are changed to direct it to perform an "add" instead of a "compare" function, and multiplexer 35, which in function is simply a two-position switch, is switched so that it feeds into the ALU 36 a binary "one" generated by the circuitry of block 37. This addition of binary "one" is a fixed circuit that is simply switched into the ALU each time a counter word is to be incremented and comprises seven "zeros" and a binary "1."

After the counter words have been incremented for one machine, the word flag flip flop 38 is reset. Concentrator flag flip flop 39 remains set until data is read from the concentrator.

Figure 4:
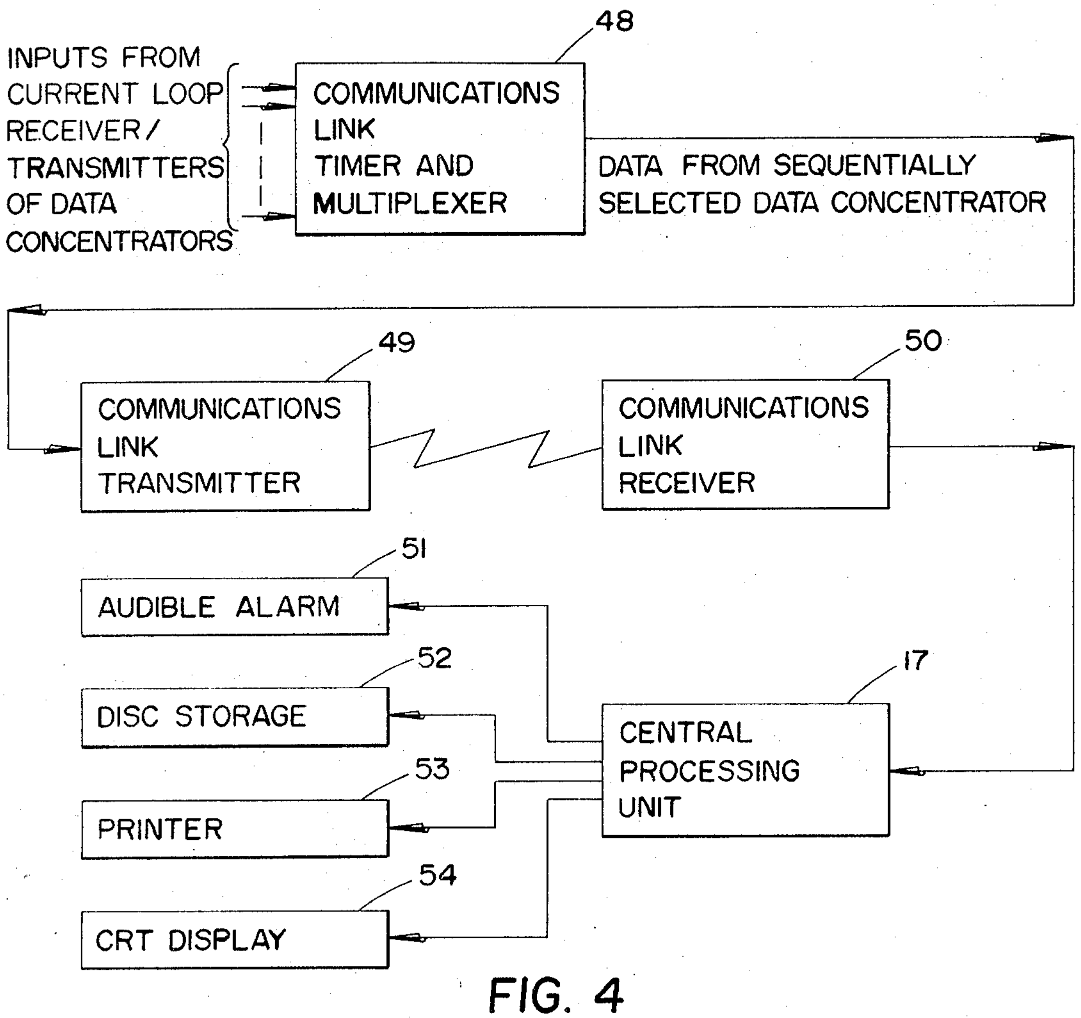
FIG. 4 is a functional block diagram of the rest of the system following the data concentrator, including the communication link and central processing unit and its recording and display accessories.

The next process of the system is to transmit the data from machines where a flag indicates that there has been a recent change. The data is transmitted over a communications link (FIG. 4) which may be of any type suitable for the transmission of binary data, but in this embodiment is a type 1005 Bell Telephone private line over which the data will be sent at 75 bits per second. Looking at FIG. 4, a communications link timer and multiplexer 48 is connected to receive the outputs from all of the data concentrators that may be used in the system. Timer and multiplexer 48 is an independent timing source controlling a sequential switch which sequentially addresses the data concentrators and sends them a "SEND DATA" signal.

Refer back now to FIG. 3 and the flow diagram of FIG. 10 for a description of the manner in which the data is selectively sent from the concentrator RAM. When the "SEND DATA" signal is received by the receiver/transmitter 43, if there is a concentrator flag 39 set indicating that the RAM contains changed data, then counter 26 starts. This counter develops the word storage slot addresses sequentially; there are 128 words stored (eight each for 16 machines) and the counter has 128 counting positions (0–127).

Referring to the FIG. 10 flow sheet, it will be seen that the fifth word of each machine's eight word set is examined. This is the second data word, as will be seen from the RAM section in FIG. 5, and if there is any change in either data word for a machine, the second data word will be flagged. This second data word is examined by being read into the 64 bit send register 40 where its flag bit is examined. If its flag bit is not set (referring again to FIG. 10) then the counter is incremented by eight to address the second data word of the next machine, and the process is repeated.

If the flag bit is set, then all eight words from the RAM for that machine are dumped into the 64 bit send register 40 and its flag bit is reset. This data receives a machine and concentrator identification (ID) code before it is transmitted. The read counter 26 develops the machine ID, since its word addresses also correspond to particular machines. A concentrator ID code 42 is hardwired into the system and these two ID codes, comprising 4 bits of machine ID and 12 bits of hardwired concentrator ID and control bits, form two additional words that are added via ID code 41 circuitry as the eight data words are clocked out of send register 40. Those 10 words are fed to the current loop receiver/transmitter 43 which is a conventional circuitry interface with this type of communication link. From the receiver/transmitter 43 the ten words of data are fed through the timer and multiplexer 48 (FIG. 4) and the communications link transmitter 49 and receiver 50 and thence to the central processing unit (CPU)17. At the end of the transmission, concentrator flag bit 39 is reset.

The CPU may be a DEC 1105 mini-computer with a 16K word core memory. This CPU and its accessory equipment receive the machine data, compile it, store it, and display it in conventional fashion, the CPU processing being entirely flexible and a function of the nature of record and control desired. To the DEC 1105 may be attached a DEC DH11-AB communications package for interface with the Bell System 1005 system. An audible alarm 51 of any conventional type may be connected to the CPU to bring instant attention to the existence of, say, a security breach in a machine. A disc storage memory 52, such as a System Industries 1.25 million word memory, may be connected to provide a large amount of data storage. The data may be displayed both on a printer 53 such as Texas Instruments type 722 thermal printer and a cathode ray tube (CRT) display terminal 54 such as Beehive Electronics Model Superbee II.

An additional advantage of the manner of storing and then transmitting data used by this monitoring system, as opposed to merely transmitting the data directly as it is generated, lies in the insurance against failure of the communication link. Such failures, of telephone or telegraph lines are not uncommon, and were the data being transmitted directly, all data generated during the down time would be lost. In this system, however, since the stored data contains a complete record and count, there is no danger of losing the data no matter how long the line is down.

The flow diagram of FIG. 9 illustrates another feature of the system. It was mentioned above in the description that although only changed data is routinely transmitted from the concentrator RAM, once every ten minutes the entire slate of data stored in each RAM is sent. This complete data dump is initiated by 10 minute timer 31 (FIG. 3) and is accomplished as indicated in FIG. 9 by starting at a RAM word known to be a data word (location 5), each data word is removed and the flag bit set. Thus all flags are set, even though the data may not have changed, and upon the next SEND DATA signal the entire slate of RAM data will be sent.

The initiation of operation of the system is shown in the "power-up" flow diagram of FIG. 7. It will be seen that it consists in setting all zeros into the RAM, clearing all registers and counters, and setting the address counter 25 to 0.

The above embodiment is merely examplary and various changes and modifications may be made without departing from the scope of the invention, which is defined solely in the appended claims.

What is claimed is:

1. A system for monitoring a plurality of machines having widely spaced locations comprising:

a plurality of binary sensors connected to each machine;

a plurality of local data storage and processing units, each corresponding to a separate group of machines and connected to every machine in that group;

means to sequentially feed binary information from sensors in each machine of a group to said local data storage and processing unit corresponding to that group;

comparison means in said local data storage and processing unit for comparing received sensor information with previous information received from the same sensor and determining and indicating the existence of a change;

a central processing unit;

scanning means for scanning said local data storage and processing units and retrieving from them only changed information; and transmission means for transmitting said changed information to said central processing unit.

2. The system of claim 1 wherein further:

said binary sensors comprise sensors connected to indicate at least one machine operation;

said local data storage and processing units each contain operation count means connected to said comparison means for counting the number of operations of said at least one machine operation and operation count storage means for storing the result of said operation count means; and said scanning means retrieves from each said local data storage and processing unit any changed operation count information.

3. The system of claim 1 wherein further:

said binary sensors comprise sensors connected to indicate the existence of at least one machine condition requiring attention; and said central processing unit contains indicating means responsive to the existence of changed machine condition information for providing an indication that a machine needs attention.

4. The system of claim 1 wherein further:

said binary sensors comprise sensors connected to indicate at least one machine operation and to indicate the existence of at least one machine condition requiring attention;

said local data storage and processing units each contain operation count means connected to said comparison means for counting the number of operations of said at least one machine operation and operation count storage means for storing the result of said operation count means;

said scanning means retrieves any changed operation count information from each said local data storage and processing unit; and said central processing unit contains indicating means responsive to the existence of changed machine condition information for providing an indication that a machine needs attention.

5. The system of claim 1 wherein:

said means to sequentially feed binary information from sensors in each machine to a local data storage and processing unit includes a. shift register storage means associated with each machine for storing information from each said sensor connected to that machine; and b. means associated with each said local storage and processing unit for sequentially feeding information from all associated machine shift register storage means to said local data storage and processing unit.

6. The system of claim 1 wherein at periodic intervals all of the information stored in said local data storage and processing units, whether recently changed or not, is transmitted to said central processing unit.

7. The system of claim 1, including further origin identification means for adding to said information selected for transmission via said transmission means an identification of the location from which said information was obtained.

* * * * *